United States Patent [19]
Brewster

[11] 3,859,530
[45] Jan. 7, 1975

[54] INFRARED DETECTION SYSTEM

[75] Inventor: Arthur Edward Brewster, Thaxted, England

[73] Assignee: International Standard Electric Corporation, New York, N.Y.

[22] Filed: Sept. 6, 1973

[21] Appl. No.: 394,941

[52] U.S. Cl. ............................. 250/334, 250/348
[51] Int. Cl. ............................................ G02b 17/00
[58] Field of Search .......... 250/334, 348, 349, 353, 250/347

[56] References Cited
UNITED STATES PATENTS

| | | | |
|---|---|---|---|
| 2,989,643 | 6/1961 | Scanlon | 250/334 |
| 2,997,588 | 8/1961 | Wilcox | 250/348 |
| 3,067,330 | 12/1962 | Hammar | 250/347 |
| 3,107,300 | 10/1963 | Stanley | 250/348 |
| 3,117,231 | 1/1964 | Haynes | 250/347 |
| 3,287,559 | 11/1966 | Barnes | 250/334 |
| 3,488,500 | 1/1970 | Welti | 250/334 |
| 3,509,345 | 4/1970 | Astheimer | 250/348 |

Primary Examiner—Harold A. Dixon
Attorney, Agent, or Firm—John T. O'Halloran; Menotti J. Lombardi, Jr.; Edward Goldberg

[57] ABSTRACT

An infrared telescopic viewer includes a large rotatable viewing mirror which directs the image input onto a small rotating oscillating mirror to scan a circular or elliptical path over an infrared detector. The detector signal is used to modulate a lamp which reflects from the scanning mirror to provide a visible display. An electromagnetic device provides mechanical oscillation of the scanning mirror. A demultiplexer-integrator-multiplexer circuit between the detector and lamp provide elemental non-uniform scan signals to improve the signal to noise ratio.

6 Claims, 3 Drawing Figures

3,859,530

INFRARED DETECTION SYSTEM

BACKGROUND OF THE INVENTION

1. Field of the Invention

This invention relates to infrared emission detection systems and particularly to passive systems designed to discern objects in relation to their surroundings by looking for differences in their thermal radiation characteristics.

2. Description of the Prior Art

Devices of this type in the past have utilized large scanning mirrors in the object space which require relatively high power driving and control equipment or a reticle arrangement which modulates the information provided to particular circuitry. The reticle type causes loss of transmission, poor signal to noise characteristics and greater expense and complexity. An example of the large scanning mirror type is found in U.S. Pat. No. 3,087,986 issued Apr. 30, 1963.

SUMMARY OF THE INVENTION

According to the present invention there is provided an improved infrared detection system including a telescope having an infrared photodetector in the focal plane of the telescope and a variable drive mechanical oscillator coupled to a relatively small scanning mirror forming part of the optical system of the telescope such that by the driven movement of the mirror the image formed by the telescope can be caused to trace out a closed loop whose shape and amplitude are alterable under the control of the variable drive oscillator. The detection system also includes display means provided with a scanning system adapted to provide a display trace whose shape is a replica of at least a portion of the closed loop traced by the image formed by the telescope, the trace being modulated by a signal derived from the output of the photodetector.

A preferred form of variable drive mechanical oscillator is one providing an elliptical trace whose amplitude can be varied and whose eccentricity can be varied over the range from 0 to 1. This form of drive may be provided electromagnetically by applying phase-related signals to the poles of a four-pole electromagnet arranged to excite into oscillation a reed on the end of which is carried the mirror. Preferably the drive frequency is chosen to match the resonant frequency of the loaded reed.

One form of suitable scanning system for the display system involves the use of a small oscillating scanning mirror coupled to the oscillating viewing mirror of the telescope. In some instances a single oscillating mirror can be used to perform both of the scanning functions.

In a preferred form of detection system the apparatus is capable of being switched between a mode of operation in which the output of the photodetector is fed directly to the display means, and a mode of operation in which the output of the photodetector is fed to the display means via a distributor, integrators connected individually one to each of the output channels of the distributor, and a multiplexer connected to the outputs of the integrators. Preferably the time constant of the integrators is adjustable.

There follows a description of an infrared emission detection system embodying the invention in a preferred form taken in conjunction with the accompanying drawings.

DESCRIPTION OF THE PREFERRED EMBODIMENTS

Figure 1:
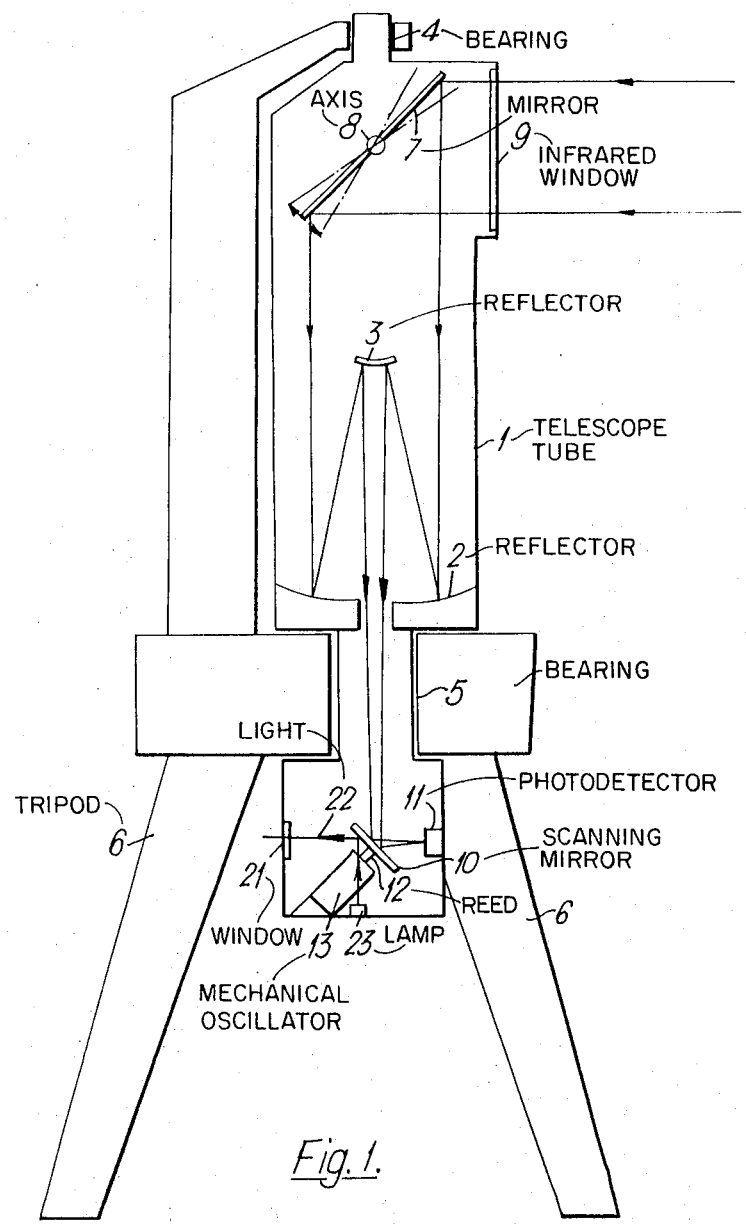
FIG. 1 schematically depicts the novel system in accordance with the present invention.

FIG. 1 depicts the general layout of the system. A Cassegrainian reflecting telescope tube 1, having a primary parabolic reflector 2 and a Cassegrainian secondary reflector 3, is mounted with its axis vertical. The tube 1 is mounted in bearings 4 and 5 upon a tripod 6 so as to permit rotation of the tube 1 about its axis. Near the top of the tube is located a plane mirror 7 pivoted about a horizontal axis 8 in the plane of the mirror. This viewing mirror is normally inclined in the region of 45° to the telescope axis, its exact inclination determining the elevation of the aiming of the telescope. The azimuthal aiming of the telescope is achieved by rotation of the telescope tube 1 in its bearings 4 and 5.

Light enters the telescope by way of an infrared transmitting window 9 and is reflected firstly by the plane mirror 7, secondly by the primary parabolic reflector 2, thirdly by the Cassegrainian secondary reflector 3, and finally by a plane driven mirror 10, before being imaged at a plane where an infrared photodetector 11 is located. The mirror 10 is mounted on a reed 12 which forms part of a mechanical oscillator 13 illustrated in greater detail in FIG. 2. The two mirrors 7, 10 may be coupled together within the supporting tube structure.

Figure 2:
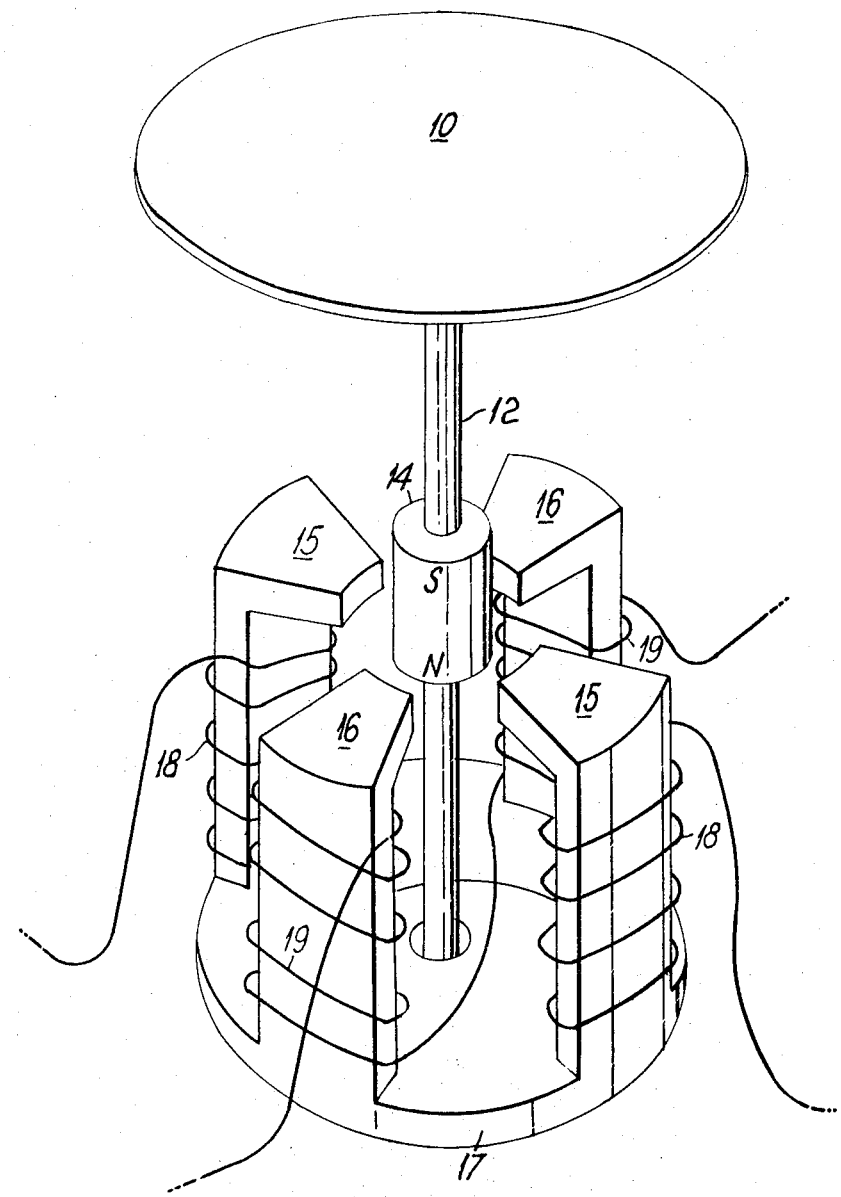
FIG. 2 depicts the mechanical oscillator in greater detail, and FIG. 3 schematically depicts a signal-to-noise ratio improving integration system.

Referring to FIG. 2 a tubular permanent magnet 14 magnetized longitudinally is secured to the reed 12 so that one of its magnetic poles shall lie in the gap between the poles 15 and 16 of a four-pole electromagnet 17. A winding 18 is used to energize poles 15 so that they have opposite magnetic polarity, and a similar winding 19 similarly induces opposite magnetic polarity in the two poles 16. Therefore the application of equal amplitude signals to the two windings in phase quadrature will produce a rotating magnetic field at the gap between the poles which will act upon the permanent magnet causing it to trace out a circular path. The diameter of this path will depend upon the amplitude of the driving signals, and by changing their relative size and phase the circular path may be transformed into an elliptical one of any desired ellipticity and orientation.

The oscillation of the reed is transmitted to the mirror 10 thereby causing the image of the scene viewed by the telescope to trace out a closed loop path over the surface of the detector 11. Referring again to FIG. 1 a replica of this path is provided at a window 21 by directing a beam of light 22 from a lamp 23 against the underside of the mirror 10. This replica may be arranged to display the scene as it is observed by the photodetector by amplifying its output and using the amplified signal to modulate the brightness of the lamp.

A considerable saving in power consumption of the mechanical oscillator is achieved by designing the system so that the mirror assembly is driven at one of its mechanically resonant frequencies, typically one in the region of 10 to 100 Hz.

In addition to, or instead of providing the display at the site of the telescope, a telemetry system may be used to provide a display at a location remote from the telescope.

In the examination of the field of the view of the telescope by the photodetector 11, particular portions can be singled out for special attention by control of the signals applied to the mechanical oscillator 13 so as to provide a trace which is concentrated upon those portions. An improvement in signal-to-noise ratio would be obtained by integrating in turn the signal from each resolvable element along the length of that trace. These integrations can be performed in strict sequence, but it is preferred to perform the integrations on a time sharing basis using the circuitry now to be described with reference to FIG. 3.

Figure 3:
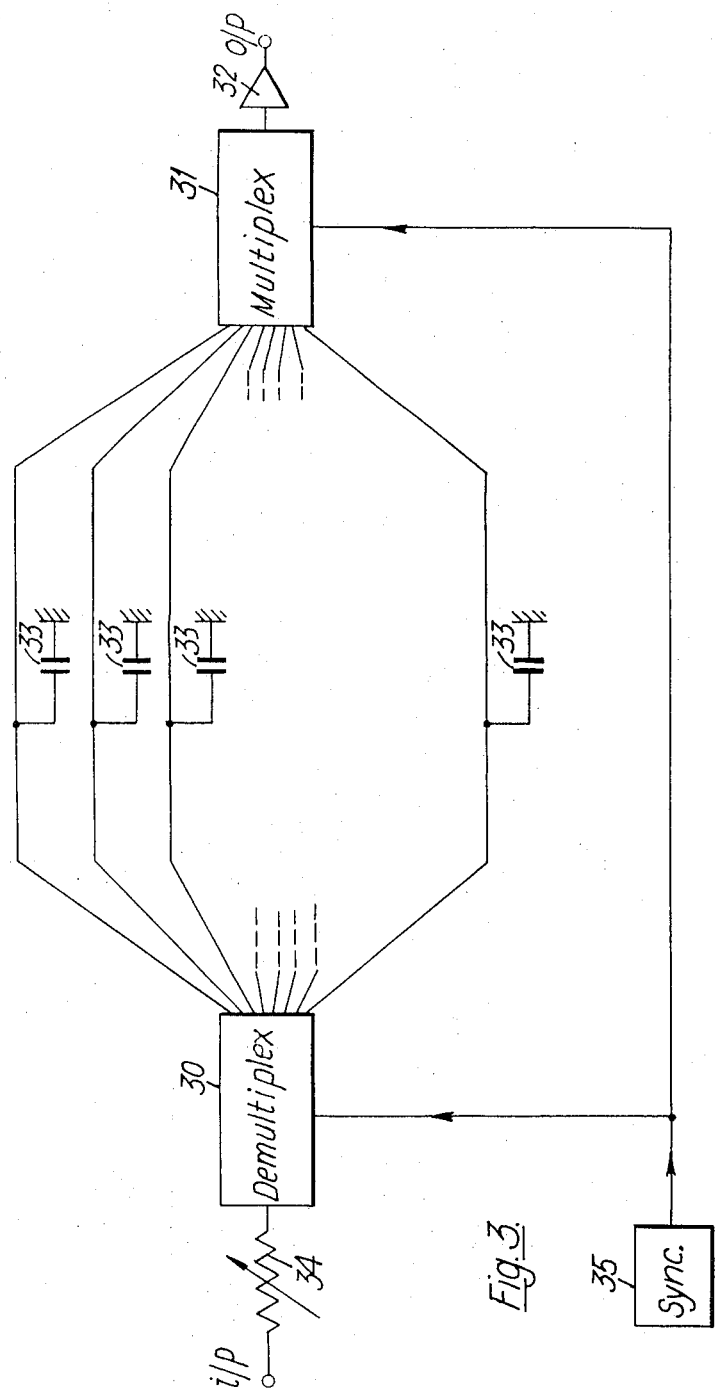

The circuitry of FIG. 3, which is designed to be inserted between the output of the photodetector 11 and the input to the lamp 23, consists essentially of a distributor 30 whose output channels are connected via a set of integrators to a multiplexer 31 followed by a high input impedance amplifier 32. The set of integrators is provided by a set of capacitors 33, one to each channel, acting in conjunction with a resistor 34 which is common to all channels. Synchronization 35 for the multiplexer 31 and demultiplexer 30 is obtained from the drive circuitry of the mechanical oscillator 13.

To understand the mode of operation of the circuitry of FIG. 3 it is necessary to appreciate that the signal output of the photodetector is a time-division multiplexed signal compounded of the signal outputs from each of the resolvable elements along the length of the trace. The distributor 30 and multiplexer 31 are normally driven at a uniform rate taking one complete period of oscillation of the mirror 10 to execute a complete cycle. Under these circumstances, if the trace is so long as to contain more resolvable elements than there are channels, the resolvable elements are shared equally between the available channels, and there is in consequence a loss of resolution. The resolution can however be restored over a limited arc of the loop by using a non-uniform drive for the distributor 30 and multiplexer 31. The drive is still required to have a period equal to the period of oscillation of the mirror 10, but over a limited arc of the trace the drive is speeded up, and then for the remainder of the trace it is arrested. In this way improved resolution is obtained over a selected portion of the trace at the expense of blanking out the remainder of the trace.

By adjusting the resistance value of the resistor 34 the time constant of integration may be varied so as to achieve an appropriate compromise between signal-to-noise ratio improvement and speed of response.

It is to be understood that the foregoing description of specific examples of this invention is made by way of example only and is not to be considered as a limitation on its scope.

What is claimed is:

1. An infrared detection system comprising a telescope receiving an image, a scanning mirror within said telescope reflecting said image, an infrared photodetector in the focal plane of the telescope, a variable drive mechanical oscillator coupled to said scanning mirror to scan said image in a closed loop of adjustable shape and amplitude over said photodetector, display means, said oscillator scanning a display trace over said display means having a shape which is a replica of at least a portion of said image closed loop, means for modulating said trace by a signal derived from the output of said photodetector, said variable drive mechanical oscillator including an electromagnet, means for energizing said electromagnet by two phase related signals whose relative phases and amplitudes are adjustable and a cantilever mounted reed supporting said mirror on said oscillator.

2. The device of claim 1 including a second rotatable mirror receiving said image and directing said image toward said scanning mirror, said second mirror being rigidly coupled to said scanning mirror.

3. The device of claim 2 wherein said display means includes a lamp directing a beam of light onto said scanning mirror, and a window receiving the reflected beam of light.

4. The device of claim 3 including a distributor coupled to said detector to receive the output thereof with a periodicity equal to that of the mechanical oscillator, integration means connected to said distributor to receive successive portions of said output, and a multiplexer connected to said integration means providing a modulated output signal, and means driving said multiplexer to sample said integration means in synchronism with the operation of said distributor.

5. The device of claim 4 including means for controlling the operation of said distributor to vary the magnitude of the phase angle of said photodetector output signal that is applied to said integration means.

6. The device of claim 5 including control means for varying the time constants of said integration means.

* * * * *